Patented Dec. 14, 1926.

1,610,331

UNITED STATES PATENT OFFICE.

PAUL SLANSKY, OF LOBOSITZ, CZECHOSLOVAKIA, ASSIGNOR OF ONE-HALF TO THE FIRM DEUTSCHE LINOLEUM-WERKE HANSA, OF DELMENHORST, GERMANY.

PROCESS FOR THE MANUFACTURE OF LINOLEUM CEMENT.

No Drawing. Application filed June 27, 1925, Serial No. 40,073, and in Czechoslovakia February 6, 1924.

This invention refers to the manufacture of linoleum cements which, as is well known, can be produced by homogeneously melting solid oxidized oils with resins in an open melting vessel at temperatures which do not exceed 150°–160° C.

According to a prior process however it is only possible to melt together those oils, which are not too greatly oxidized, and have not been stored for long. If the oil has been too much oxidized, it becomes increasingly crumbly in the cement vessel, heats up of its own accord and finally ignites.

The reason for this phenomenon is that the strongly oxidized oils have higher melting points than those which are moderately oxidized. However if these strongly oxidized oils are heated to higher temperatures, a further oxidation takes place in such a vigorous manner, that the oxidized oil kindles of its own accord. It is therefore owing to this vigorous further oxidation that the crumbly oil, having a considerable capacity for attracting oxygen, presents a large surface thereto, so that with the exothermic reaction and bad conduction of heat, the temperature rises to the degree at which the substance ignites.

In accordance with the present invention the process of melting solid oxidized oils for the manufacture of linoleum cement is carried out in the absence of oxygen.

The exclusion of oxygen is brought about in a preliminary step in any suitable manner, as for instance, by its displacement with inert gases or by removing the oxygen by vacuum.

The addition of resins to oxidized drying oils is known in the manufacture of linoleum cements and in accordance with the present invention, such resins as colophony, kauricopal and so on may be added and a small percentage of water, not exceeding 10% by weight of the total oxidized oils and resins used, may be advantageously added. The water tends to decrease the melting point of the oxidized oil and the reaction is thus permitted to operate at a relatively lower temperature if desired.

The absence of oxygen makes it possible to use much higher temperatures than would otherwise be possible.

Example I.

80 kgs. of linoxyn are mixed with 15 kgs. of colophony and 5 kgs. of kauricopal resin, the New Zealand copal which is difficult to melt, and the mixture is heated in an autoclave at 160° C. after all the oxygen has been removed. The pressure in the autoclave which is generated by the gases evolved from the oils, resins and water rises to about 3 atmospheres at a temperature of 160° C.

The melting of the mass in the autoclave can be accelerated if the same is worked up in a moist state, that is to say, if it contains a relatively small amount of water—not exceeding ten per cent.

Example II.

The process is the same as in Example I, but in place of the linoxyn 50 kg. oxidized perilla oil are used.

What I claim is:—

A process for the manufacture of a linoleum cement consisting of melting under pressure a solid oxidized vegetable drying oil together with resins in the presence of a small percentage of water and in the absence of all gases capable of yielding oxygen, the pressure being developed from the gases volatilized from the oil resins and water during the melting thereof.

In testimony whereof I affix my signature.

PAUL SLANSKY.